United States Patent [19]

Fisher

[11] 4,018,321
[45] Apr. 19, 1977

[54] ESCAPE SLIDE AND PLATFORM ASSEMBLY

[75] Inventor: John Melvin Fisher, Cuyahoga Falls, Ohio

[73] Assignee: The B. F. Goodrich Company, Akron, Ohio

[22] Filed: May 21, 1976

[21] Appl. No.: 688,748

[52] U.S. Cl. .............................. 193/25 B; 182/48; 244/137 P

[51] Int. Cl.² ..................... B65G 11/10; A62B 1/20

[58] Field of Search .......... 193/25 R, 25 B; 182/48; 244/137 P; 9/11 A

[56] References Cited

UNITED STATES PATENTS

| 3,473,641 | 10/1969 | Fisher | 193/25 B |
|---|---|---|---|
| 3,476,338 | 11/1969 | Fisher | 244/137 P |
| 3,598,215 | 8/1971 | Summer et al. | 244/137 P |
| 3,692,144 | 9/1972 | Summer et al. | 193/25 B |
| 3,827,094 | 8/1974 | Fisher | 193/25 B |
| 3,845,920 | 11/1974 | Satterfield et al. | 182/48 |
| 3,860,984 | 1/1975 | Fisher | 193/25 B |
| 3,866,734 | 2/1975 | Elkins et al. | 193/25 B |
| 3,973,645 | 8/1976 | Dix et al. | 182/48 |

*Primary Examiner*—Evon C. Blunk
*Assistant Examiner*—Jeffrey V. Nase
*Attorney, Agent, or Firm*—Harry F. Pepper, Jr.; W. A. Shira, Jr.

[57] ABSTRACT

An inflatable, generally horizontal, elevated platform fastened to a supporting structure is connected to an inflatable escape slide extending downwardly at an inclination from the platform to a lower surface. An elongated tension strap is connected at one end to the platform adjacent the supporting structure and at the other end to the slide at a position around midway down the slide to reinforce the platform and maintain the horizontal position of the platform under the weight of persons using the platform and slide.

The slide may have a laterally extending inflatable member on the underside with longitudinally extending slide reinforcing tension members cooperative with the laterally extending inflatable member to provide a truss-like structure. The tension strap for reinforcing the platform may be connected to the slide at a position at the laterally extending inflatable member at one end and be connected to the platform at a position adjacent the supporting structure at the other end. The platform also may have an edge connected to the slide which is not parallel to the edge adjacent the supporting structure in which case the tension member is located on the side of the platform where the edges are the greatest distance apart.

11 Claims, 4 Drawing Figures

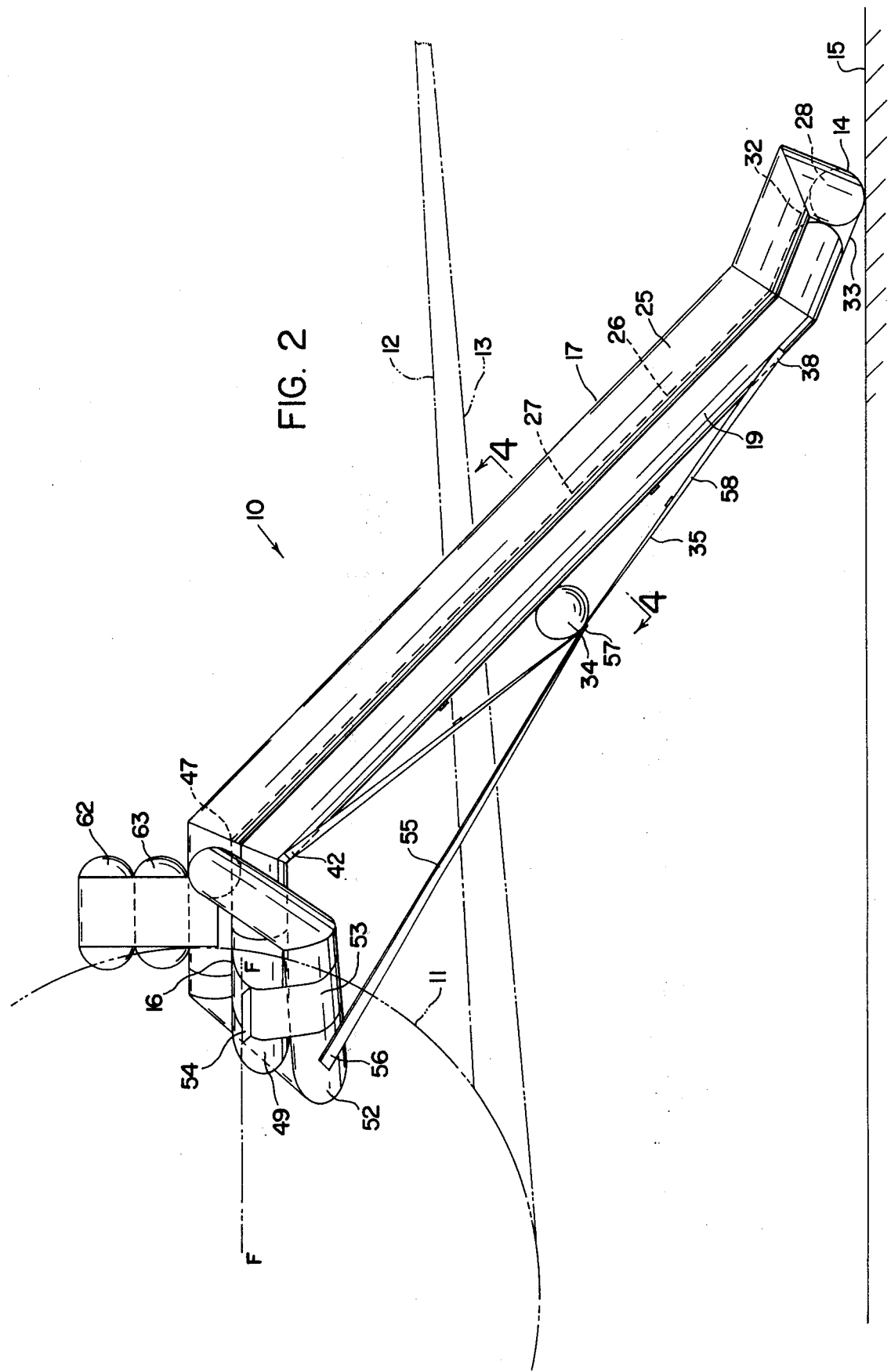

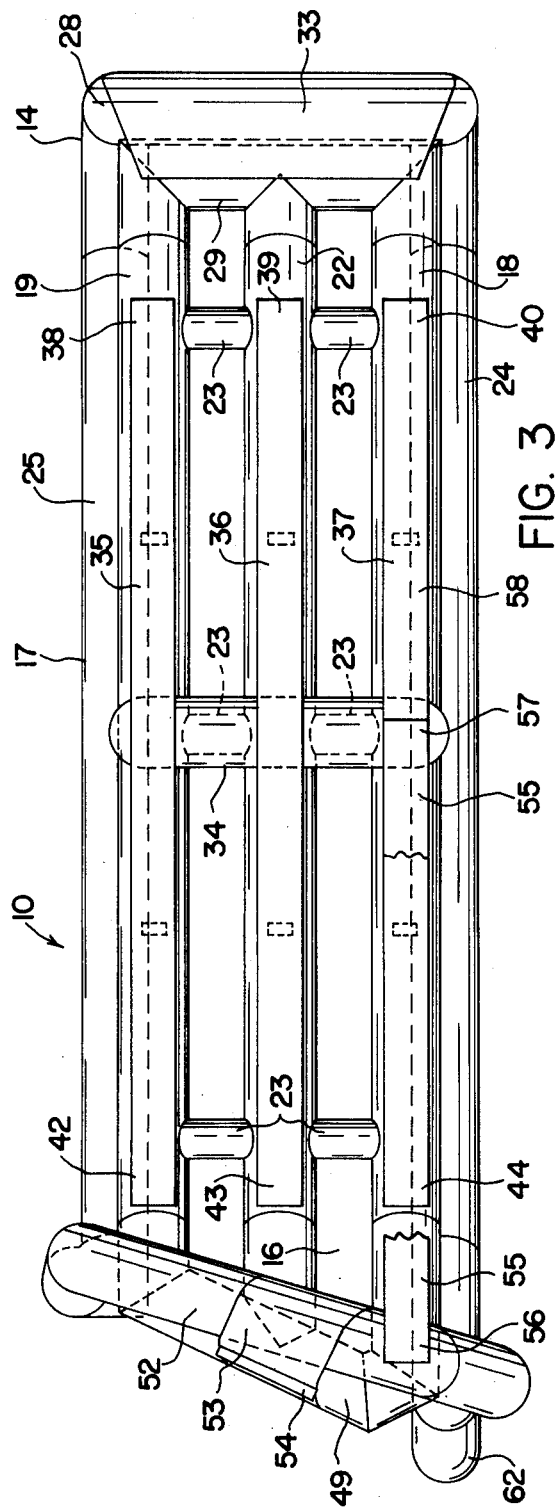

ESCAPE SLIDE AND PLATFORM ASSEMBLY

BACKGROUND OF THE INVENTION

This invention relates to an inflatable aircraft evacuation system and especially to an inflatable slide which may also serve as a raft when an aircraft is ditched in the water. In some aircraft, there are doors which are located partially over the wing which precludes the use of a slide extending outwardly from the aircraft in a direction generally perpendicular to the fuselage. A suggested solution to this problem has been to add a horizontal platform or porch section to the upper end of the slide so that the slide can be positioned sufficiently outboard and at an angle to the aircraft to clear the edge of the wing.

It has been found that with this escape slide and platform assembly, the platform will deflect and tilt under the weight of persons on the platform causing them to lose their footing prior to reaching the slide. This has occured even though the slide is reinforced with longitudinally extending slide reinforcing tension members extending between the ends of the slide and over an inflatable laterally extending spacer member at the underside of the slide as illustrated and described in my U.S. Pat. No. 3,473,641 dated Oct. 21, 1969. In view of the fact that the aircraft door and platform for the assembly for modern jet passenger planes are located many feet off the ground, it is important that the platform be maintained in a stable horizontal position. This is especially true during emergency conditions when evacuation must be rapid in all kinds of weather during the day or night.

SUMMARY OF THE INVENTION

According to this invention, the platform is supported against deflection and tilting by an elongated tension member extending between the platform and slide at positions such that in the inflated condition a stable structure will result. Stability is provided even though the slide is at an angle to the door and the edge of the platform abutting the aircraft fuselage is not parallel to the edge connected to the slide. This stability is also obtained without sacrificing the utility of the slide as a raft.

The accompanying drawings show one preferred form made in accordance with and embodying this invention and which is representative of how this invention may be practiced.

BRIEF DESCRIPTION OF THE DRAWINGS

In the drawings:

FIG. 2 is a side elevation taken along the plane of line 2—2 in FIG. 1.

FIG. 3 is a bottom plan view with parts being broken away.

FIG. 4 is a cross-sectional view taken along the plane of line 4—4 in FIG. 2.

DETAILED DESCRIPTION

Figure 1:
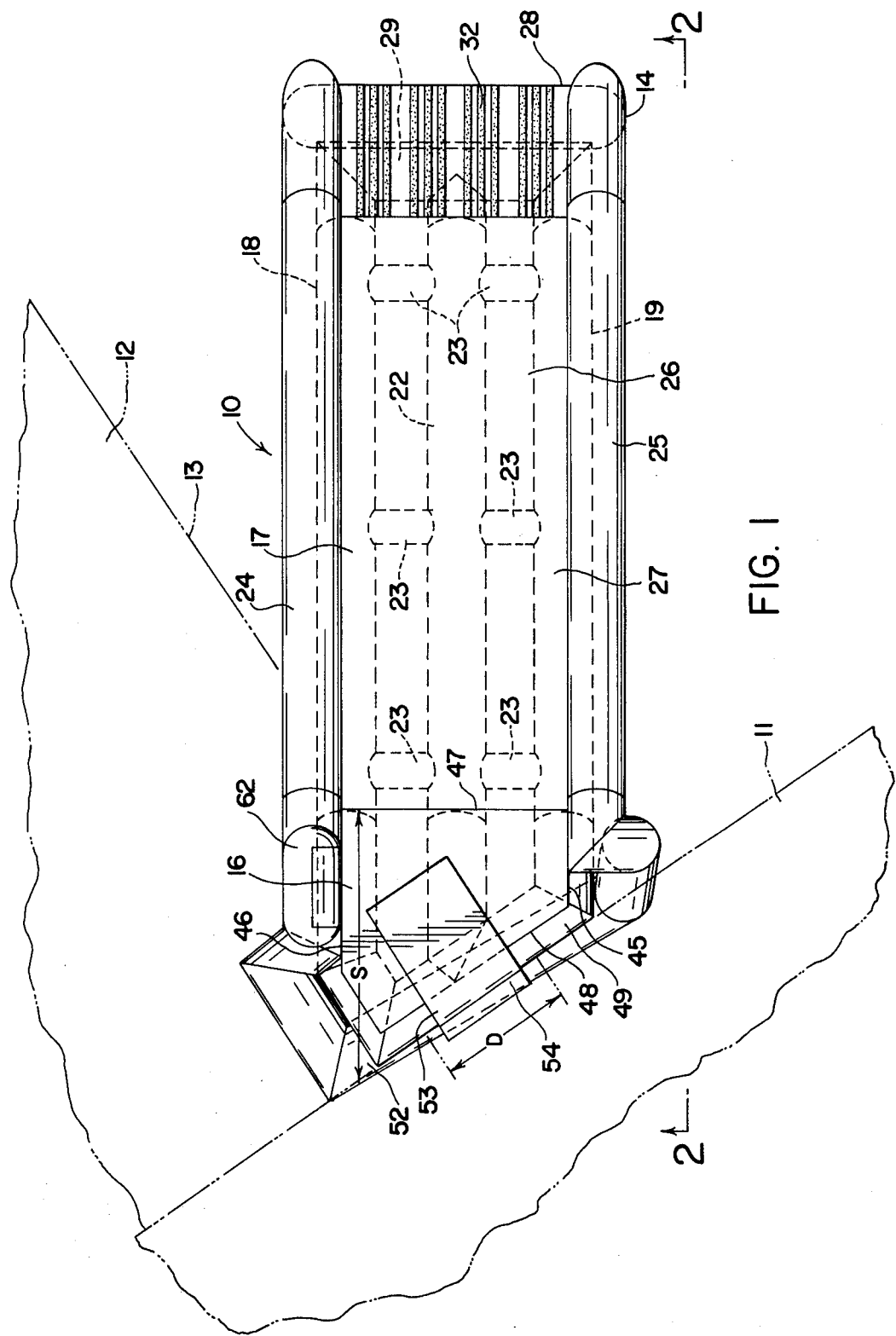
FIG. 1 is a partially schematic plan view of an inflatable platform and slide assembly mounted on an aircraft in the extended inflated condition with the aircraft fuselage and wing being shown in chain-dotted lines.

Referring to FIGS. 1 and 2, a multitubular inflatable escape slide and platform assembly 10 is shown in the inflated condition in position for evacuating passengers from an elevated supporting structure such as an aircraft having a fuselage 11 and a wing 12 shown in chain-dotted lines. The fuselage 11 has a doorway schematically indicated by the letter D in FIG. 1 with a floor level indicated by the chain-dotted lines F—F in FIG. 2. As shown in the drawings, the doorway D of the fuselage 11 is located in such a position that the slide and platform assembly 10 must extend rearwardly to clear a trailing edge 13 of the wing 12 in order that a toe end 14 of the assembly may be extended downwardly to a position where it will rest on a lower supporting surface such as ground 15.

The slide and platform assembly 10 in the inflated condition has a generally horizontal platform 16 at the girt end and a slide 17 extending from the platform to the toe end 14. As shown in the drawings, the slide 17 has a pair of longitudinally extending lower side tubes including left-hand lower side tube 18 and a right-hand lower side tube 19. A central main tube 22 is located between the left-hand lower side tube 18 and right-hand lower side tube 19 and connected thereto by separating tubes 23. The slide 17 also has a pair of longitudinally extending upper side tubes including a left-hand upper side tube 24 and a right-hand upper side tube 25 which are mounted on the top the lower side tubes 18 and 19. A center lower panel 26 is fastened to the lower side tubes 18 and 19 and central main tube 22 between the upper side tubes 24 and 25 providing a slide surface 27 on which the passengers may descend to the toe end 14 of the slide and platform assembly 10.

The toe end 14 has a laterally extending toe end upper side tube 28 and a laterally extending toe end lower side tube 29 around which a deceleration panel 32 and toe abrasion panel 33 are wrapped. As shown in FIG. 3, the central main tube 22 is connected to the laterally extending toe end lower side tube 29 as are the lower side tubes 18 and 19. The upper side tubes 24 and 25 are connected to the laterally extending toe end upper side tube 28.

A laterally extending inflatable member in the form of a truss tube 34 is fastened to the undersides of the lower side tubes 18 and 19 and the central main tube 22 at a position approximately one-half the length of the slide 17 from the ends of the slide. Elongated longitudinally extending slide reinforcing tension members in the form of straps 35, 36 and 37 abuttingly engage the lower surface of the truss tube 34 and are fastened to the underside of the lower side tubes 18 and 19 and the central main tube 22 at positions 38, 39 and 40 near the toe end 14 of the slide and platform assembly 10 and at positions 42, 43 and 44 on the slide 17 near the upper end of the slide as shown in FIG. 3. The straps 35, 36 and 37 fastened to the truss tube 34 and lower side tubes 18 and 19 and central main tube 22 reinforce the slide 17 and give it a rigidity making possible the extension of the slide 17 at an angle to the ground which is desirable for evacuation of passengers. This form of truss construction is described in my U.S. Pat. No. 3,473,641.

The slide 17 joins the platform 16 at the girt end of the slide and platform assembly 10 and the lower panel 26 extends from the slide over the platform. The platform 16 has a first or right side 45 which is shorter than a second or left side 46. Accordingly, a first edge or slide edge 47 of the platform 16 is at an angle to the second or girt edge 48 of the platform. The lower side tubes 18 and 19 and the central main tube 22 of the slide 17 extend into the platform and are connected by a laterally extending girt end lower side tube 49. The upper sides tubes 24 and 25 also extend along the sides 45 and 46 of the platform 16 and downwardly along the fuselage 11 to a laterally extending girt end upper side tube 52 which is mounted at the underside of the girt end lower side tube 49. A girt assembly 53 extends around the lower side tube 49 and upper side tube 52 and has a flap 54 for attachment to the aircraft. Additional platform supporting tubes (not shown) may be mounted between the lower side tubes 18 and 19 and the central main tube 22 to further support the floor panel 26 in the platform area.

As shown in FIGS. 1 and 2, the upper end of the slide 17 is at a position in close proximity to the fuselage 11 at the right side 45 of the platform 16; however, the upper end of the slide is spaced apart from the fuselage a substantial distance S, as shown in FIG. 1, creating a condition where the platform 16 will tend to deflect and tilt under the weight of persons on the platform causing a dangerous situation.

Referring to FIGS. 2, 3 and 4, a platform support such as an elongated platform supporting tension member of flexible platform strap 55 is shown with an upper end 56 fastened to the underside of the girt end upper side tube 52 at a position under the tube and adjacent the fuselage 11. A lower end 57 is fastened to the strap 37 at the position where the strap is fastened to the truss tube 34 which is at a distance from the platform 16 of around one-half the length of the slide 17. The platform strap 55 and a lower portion 58 of the strap 37 provide a reinforcing member extending from the girt end upper side tube 52 of the platform 16 to a position on the right-hand lower side tube 19 adjacent the toe end 14 of the slide and platform assembly 10. With this construction, the platform 16 will be maintained in a horizontal position during evacuation of passengers from the aircraft.

The slide and platform assembly 10 may be constructed of a suitable material such as square-woven nylon fabric impregnated with neoprene to retain air or other inflation medium in the inflatable parts. The straps 35, 36 and 37 reinforcing the slide 17 and the platform strap 55 may also be of square-woven nylon and adhered to the assembly by a suitable adhesive in a shear bond.

Other parts may be incorporated in the slide and platform assembly 10 of this invention such as rail tubes 62 and 63 which are fastened to the left-hand upper side tube 24 at the platform 16 as shown in FIGS. 1, 2 and 4.

The slide and platform assembly 10 may also be detached and used for a raft when the aircraft is ditched in the water. When this happens, the inclined toe end 14 is automatically raised at that end of the slide 17 to prevent water from entering the space between the left-hand upper side tube 24 and right-hand upper side tube 25. At the girt end of the assembly, the space between the upper side tubes 24 and 25 will be closed by the bending of the slide 17 at the slide edge 47 under the weight of the passengers. The tension in the platform strap 55 contributes to the effective closing of the slide 17 at the girt end. In this manner, the slide and platform assembly 10 becomes an effective raft when released from the fuselage 11.

Although the preferred embodiment shown and described herein is for a slide 17 extending from a substantially triangular platform 16, it is understood that the invention may also be applied to a contstruction where the platform is rectangular and additional platform straps 55 may be utilized on both sides of the slide. Although the truss tube 34 shown and described is an elongated tube, it is understood that two or more truss pillows may be used instead of one long tube. The straps 35, 36, 37 and platform strap 55 may also be of other tension-resisting material such as cables providing suitable stress-distributing connections are made with the other members of the slide and platform assembly 10. It is also within the scope of this invention to fasten the lower end 57 of the platform strap 55 directly to the underside of the slide to provide the desired platform support.

I claim:

1. An escape slide and platform assembly adapted to be inflated and extend from a supporting structure at an elevated position to a lower surface comprising a generally horizontal platform, an escape slide inclined downwardly from said platform and extending to said lower surface, and an elongated platform supporting tension members means connected at one end to said platform at a first position spaced from said slide and connected at the other end to said slide at a second position spaced from said platform to sustain said platform in said generally horizontal position under the weight of persons using the assembly.

2. An escape slide and platform assembly according to claim 1 wherein said first position on said platform at which said platform supporting tension member means is connected at one end is located adjacent said supporting structure.

3. An escape slide and platform assembly according to claim 2 wherein said second position at which said other end of said platform supporting tension member means is connected to said slide is located at a distance from said platform of around one-half the length of said slide.

4. An escape slide and platform assembly according to claim 1 wherein said slide and platform comprise a series of inflatable tubes of flexible material and said platform supporting tension member means is a flexible strap adhered to said platform and to said slide by an adhesive.

5. An escape slide and platform assembly according to claim 1 wherein said platform has a first side and an opposing second side, a first edge connected to said slide and an opposing second edge for abutting said supporting structure, said first edge being closer to said second edge at said first side than at said second side and said first position on said platform being adjacent said second side and next to said supporting structure.

6. An escape slide and platform assembly according to claim 1 wherein said slide has a laterally extending inflatable member attached to the underside of said slide, an elongated longitudinally extending slide reinforcing tension member abuttingly engaging the lower surface of said laterally extending member and cooperative with said slide and laterally extending member to provide a truss-like structure and said second position at which said platform supporting tension member means is connected being located where said slide reinforcing tension member engages said laterally extending member.

7. An escape slide and platform assembly according to claim 6 wherein said laterally extending member is located at a distance from said platform equal to around one-half the length of said slide.

8. An escape slide and platform assembly according to claim 1 wherein said slide is an elongated inflatable body and said platform is an extension of said body.

9. An escape slide and platform assembly according to claim 8 wherein said slide has a pair of longitudinally extending inflatable lower side tubes extending into said platform and connected to a first laterally extending inflatable end tube adjacent said supporting structure.

10. An escape slide and platform assembly according to claim 9 wherein said slide has a laterally extending inflatable member attached to the underside of said slide, an elongated longitudinally extending slide reinforcing tension member abuttingly engaging the lower surface of said laterally extending member and cooperative with said slide and laterally extending member to provide a truss-like structure and said second position where said platform supporting tension member means is connected being located where said slide is reinforcing tension member engages said laterally extending member.

11. An escape slide and platform assembly according to claim 9 wherein said slide has a pair of inflatable upper side tubes attached to said first pair of lower side tubes and said pair of upper side tubes extend into said platform and are connected to a laterally extending inflatable tubular second end tube, said second end tube extending beneath said first end tube and adjacent said supporting structure and said first position being located on said second end tube.

* * * * *